(12) United States Patent
Brundridge et al.

(10) Patent No.: US 6,865,691 B1
(45) Date of Patent: Mar. 8, 2005

(54) SYSTEM AND METHOD FOR IDENTIFYING EXECUTABLE DIAGNOSTIC ROUTINES USING MACHINE INFORMATION AND DIAGNOSTIC INFORMATION IN A COMPUTER SYSTEM

(75) Inventors: Michael A. Brundridge, Georgetown, TX (US); Javier L. Jimenez, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 519 days.

(21) Appl. No.: 09/633,450

(22) Filed: Aug. 7, 2000

(51) Int. Cl.[7] ............................................. G06F 11/00
(52) U.S. Cl. .......................................... 714/25; 714/38
(58) Field of Search ............................. 714/25, 36, 37, 714/38, 40; 717/124, 126, 168, 173

(56) References Cited

U.S. PATENT DOCUMENTS

| | | | |
|---|---|---|---|
| 4,670,834 A * | 6/1987 | Byal et al. ................... 700/81 |
| 5,335,231 A * | 8/1994 | Kato ............................ 714/31 |
| 5,423,028 A | 6/1995 | Schieve et al. |
| 5,463,766 A | 10/1995 | Schieve et al. |
| 5,530,847 A | 6/1996 | Schieve et al. |
| 5,634,022 A * | 5/1997 | Crouse et al. ............... 717/130 |
| 5,748,877 A | 5/1998 | Dollahite et al. |
| 5,805,796 A | 9/1998 | Finch et al. |
| 6,006,344 A | 12/1999 | Bell, Jr. |
| 6,065,136 A * | 5/2000 | Kuwabara ..................... 714/31 |
| 6,151,683 A * | 11/2000 | Wookey ......................... 714/2 |
| 6,516,427 B1 * | 2/2003 | Keyes et al. .................. 714/25 |
| 6,550,024 B1 * | 4/2003 | Pagurek et al. ................ 714/47 |

* cited by examiner

*Primary Examiner*—Dieu-Minh Le
(74) *Attorney, Agent, or Firm*—Haynes and Boone, LLP

(57) ABSTRACT

A system and method for identifying executable diagnostic routines using machine information and diagnostic information in a computer system is provided. The method includes detecting machine information, detecting diagnostic information corresponding to the machine information, and causing one of a plurality of diagnostic routines to be selectable for execution according to the diagnostic information.

13 Claims, 11 Drawing Sheets

DIAGCONF.INI File 500

[Win9x] ←—512
SupportedDiags=AGP|Audio|AVI|CD/DVD-ROM|CMOS|CPU|
Extended SMART Drive|Floppy Drive|Hard Drive|Infrared Port|Joystick|Keyboard|
Microphone|Modem|Monitor|Mouse|Network Adapter|Parallel Port|PCI|PCMCIA|
Printer|SCSI|Serial Port|SMART Drive|Super Disk|System Diagnosis|System Memory|
USB|Video Adapter|Zip Drive
⎫
⎬ 510
⎭

[WinNT] ←—522
SupportedDiags=AGP|Audio|AVI|CD/DVD-ROM|CMOS|CPU|Extended SMART Drive|
Floppy Drive|Hard Drive|Joystick|Keyboard|Microphone|Modem|Monitor|Mouse|
Network Adapter|Parallel Port|Printer|SCSI|Serial Port|SMART Drive|Super Disk|
System Diagnosis|System Memory|Tape Backup|Video Adapter|Zip Drive
⎫
⎬ 520
⎭

[Win2K] ←—532
SupportedDiags=AGP|Audio|AVI|CD/DVD-ROM|CMOS|CPU|Extended SMART Drive|
Floppy Drive|Hard Drive|Joystick|Keyboard|Microphone|Modem|Monitor|Mouse|
Network Adapter|Parallel Port|Printer|SCSI|Serial Port|SMART Drive|Super Disk|
System Diagnosis|System Memory|Tape Backup|Video Adapter|Zip Drive|USB
⎫
⎬ 530
⎭

.
.
.

[Hard Drive] ←—540
abstract=HardDisk Drive Diagnostic ←—542
icon=HardDrive.jpg ←—544

.
.
.

[0xBA] ←—550
;Code=Mummy
;Audience=Dimension  } 552
;Computer=Dimension Columbus II
Win9xExclude=AVI|Extended SMART Drive|SMART Drive|Monitor|Infrared Port| ←—556
PCMCIA|Tape Backup
WinNTExclude=AVI|Extended SMART Drive|SMART Drive|Monitor|Infrared Port| ←—558
PCMCIA|PCI|USB
Win2KExclude=AVI|Extended SMART Drive|SMART Drive|Monitor|Infrared Port| ←—560
PCMCIA|PCI
} 554

Java Script/Methods/Functions: ← 600

```
function parseDiagIni (sMachineId)
{
    // *** Get Diagnostic Information File location. ← 602
    var sIniFile = getDiagConfFile ();

// *** Determine OS platform, a Java method is called which in turn calls a
    // Windows API that returns the OS installed.    ← 604
    var sOSString = "";
    if (IsWindowsNT ())
        sOSString = "WinNT";
    else if (IsWindows2000 ())
        sOSString = "Win2K";
    else if (IsWindows98 () || IsWindows95 ())
        sOSString = "Win9x";

// *** Load list of supported diagnostics for the OS platform from the   ← 606
    // information file.
    var xSupportedDiags = iniApi.GetEntry (sOSString, "SupportedDiags",
    sIniFile);
    xSupportedDiags.Print ();
    if (xSupportedDiags.GetReturnCode () != 0) {
        DebugPrint ("No SupportedDiags variable for " + sOSString);
        return;
    }
    sSupportedDiags = xSupportedDiags.GetAttribute ("value");
    DebugPrint ("SupportedDiags = " + sSupportedDiags);
    var aSupportedDiags = parseLine (sSupportedDiags);
```

*Fig. 6a*

```
                                                                          608
                                                                         ↙
// *** Load list of unsupported diagnostics from the information file based
on machine and OS platform.
    var xExcludeDiags = iniApi.GetEntry (sMachineId, sOSString + "Exclude",
sIniFile);
        xExcludeDiags.Print ();
    if (xExcludeDiags.GetReturnCode () == 0) {
        DebugPrint("Now entering - excluded diags section - svk");
            sExcludeDiags = xExcludeDiags.GetAttribute ("value");
        DebugPrint("ExcludeDiags = " + sExcludeDiags);
        var aExcludeDiags = parseLine (sExcludeDiags);
// *** Remove the excluded diagnostics from the supported list. ← 610
        for (var i = 0; i < aExcludeDiags.length; i++) {
            for (var j = 0; j < aSupportedDiags.length; j++) {
                if (aExcludeDiags[i] == aSupportedDiags[j]) {
                    aSupportedDiags[j] = "";
                }
            }
        }
    }
else {
        DebugPrint ("No Exclude list for " + sOSString + "on" + sMachineId);
}
```

*Fig. 6b*

```
// *** Build list of supported diagnostic and presentation items from the
information file.                                                         612
   //   Diagnostic|Abstract|Icon File Name||Diagnostic...
   aDiagConfData = new Array ();
   aDiagConfData[0] = "abstract";
   aDiagConfData[1] = "icon";
   var sFinalDiagsSupported = "";
   var sSeparator = "|";
   var sSuperSeparator = "||";
   for (var j = 0; j < aSupportedDiags.length; j++) {
      DebugPrint ("Testing" + aSupportedDiags[j]);
      if ("" != aSupportedDiags[j]) {
         var Abstract = "";
         var Icon = "";
         var xDiagConfDataAbs = iniApi.GetEntry (aSupportedDiags[j],
aDiagConfData[0], sIniFile);
         if (xDiagConfDataAbs.GetReturnCode () == 0)
            Abstract = xDiagConfDataAbs.GetAttribute ("value");
         var xDiagConfDataIcon = iniApi.GetEntry (aSupportedDiags[j],
aDiagConfData[1], sIniFile);
         if (xDiagConfDataIcon.GetReturnCode () == 0)
            Icon = xDiagConfDataIcon.GetAttribute ("value");
         sFinalDiagsSupported = sFinalDiagsSupported + aSupportedDiags[j] +
sSeparator + Abstract + sSeparator + Icon + sSuperSeparator;
      }
   }
   // *** Set the envinonment global space    614
   iapi.SetGlobalArg ("DellSupportedDiags", sFinalDiagsSupported);
}

// *** Load the machine id for the machine under test.    616
s = new java.lang.StringBuffer (200);

// *** Call a Java method that extracts the Machine ID from the SMBIOS    618
table
DellAPI.GetMachineID (s);
if (s.toString ().length () > 0 ) {
   // Set the Machine Id in the following format: OxFF. This is used to look the
system up in DiagConf.ini
   g_sMachineId = "0x" + s.toString ();
}
// *** Create the list of supported diagnostics and their presentation items.    620
parseDiagIni (g_sMachineId);
```

Dell Resolution Assistant – Microsoft Internet Explorer

File   Edit   View   Favorites   Tools   Help

Address: http://localhost:5197/Dell/mots/content/template/Resolution...

DELL RESOLUTION ASSISTANT    DIMENSION    e-support DIRECT FROM DELL

HardDisk Drive Diagnostic

FAQ'S Read a Frequently Asked Question about the device or problem.

1. What size hard drive can I add to my Dell Dimension System?
2. Why is my hard drive so noisy?
3. How do I add a hard drive to my system?

More FAQ's...

In order to be assisted by Online-service, you must first run this diagnostic which will gather all the relevant information that is required by the online technician to process your request.

OVERVIEW Run a diagnostic test on the device.

This diagnostic consists of four subtests:

- Linear Seek Test – Verifies correct operation of the drive heads
- Random Seek Test – Verifies correct operation of the drive heads
- Funnel Seek Test – Verifies correct operation of the drive heads
- Surface Scan Test – Scans the drive for defective sectors This diagnostic tests the hard-disk drive controller, the drive mechanism, and the disk surface itself. All installed fixed disks are tested.

> NOTE: Running a diagnostic test allows Dell to access information on your computer. If you do not want Dell to access this information, change the Resolution Assistant security settings found under preferences in the bottom navigation bar of this interface.

Click here to run the diagnostic test.    [ BEGIN DIAGNOSTIC ]  ← 722

Go back to the List of Diagnostics.

Copyright © 1999-2000 Dell Inc. All Rights Reserved

Home | Support | Service Status | Preferences | Privacy Policy | About

SYSTEM AND METHOD FOR IDENTIFYING EXECUTABLE DIAGNOSTIC ROUTINES USING MACHINE INFORMATION AND DIAGNOSTIC INFORMATION IN A COMPUTER SYSTEM

BACKGROUND

The disclosures herein relate generally to computer systems, and more particularly, to a system and method for identifying executable diagnostic routines using machine information and diagnostic information in a computer system.

A computer system may include a diagnostic package with a set of diagnostic routines that may be executed to test components in the system. The manufacturer of the computer system may purchase a diagnostic package that includes a set of diagnostic routines from a third party vendor. The diagnostic package, however, may not include platform or operating system specific information that may be used to identify the diagnostic routines that are executable on a given platform and/or operating system.

A computer manufacturer may wish to support only certain devices on certain platforms and/or operating systems. For example, a computer manufacturer may wish to sell a computer system that does not support joysticks. The diagnostic package installed by the computer manufacturer in this computer system, however, may include a diagnostic routine for a joystick that is executable by a customer. Diagnostic packages typically do not include a method for restricting the display and execution of a diagnostic routine for a component which a computer manufacturer does not wish to support. Thus, in the example above, the computer manufacturer may not be able to prevent the diagnostic routine for the joystick from being displayed and executed using only the diagnostic package.

It may be possible to write a custom installation program for each platform that specified only the components supported by each platform to allow only supported diagnostic routines to be displayed and executed. To do so, however, a computer manufacturer would need to write such a program for each different platform it offered. Such a program would require a costly and inefficient development effort and testing process for each platform sold by a manufacturer. A system and method is needed that identifies supported diagnostic routines in a diagnostic package for a given computer system regardless of the platform or operating system used by the computer system. A system and method is also needed to display only the supported diagnostic routines of the computer system to its user.

SUMMARY

One embodiment, accordingly, provides a system and method for identifying executable diagnostic routines using machine information and diagnostic information in a computer system. To this end, a method includes detecting machine information and detecting diagnostic information corresponding to the machine information. The method also includes causing one of a plurality of diagnostic routines to be selectable for execution according to the diagnostic information.

A principal advantage of this embodiment is that an entire suite of diagnostic routines may be installed on each computer system offered by a computer manufacturer while only supported diagnostic routines may be made selectable for execution on a particular system based on certain characteristics of that system. In this way, the process of installing diagnostic routines may be substantially similar or even identical for each system that a computer manufacturer offers. In addition, this embodiment may advantageously allow a computer manufacturer to change the set of supported diagnostic routines on a system or systems while minimizing the development effort and test cycle for each change. The embodiment may also advantageously allow a computer manufacturer to easily offer additional systems or test support with minimal development effort and testing.

BRIEF DESCRIPTION OF THE DRAWING FIGURES

FIG. 5 is an embodiment illustrating types of information that may be included in a diagnostic information file.

FIG. 6a is a first part of an embodiment illustrating a diagnostic script that may be used to determine what diagnostic routines a computer system supports.

FIG. 6b is a second part of an embodiment illustrating a diagnostic script that may be used to determine what diagnostic routines a computer system supports.

FIG. 6c is a third part of an embodiment illustrating a diagnostic script that may be used to determine what diagnostic routines a computer system supports.

FIG. 7c is an illustration of a third screen displayable by a display device in the embodiment shown in FIG. 1.

DETAILED DESCRIPTION

Figure 1:
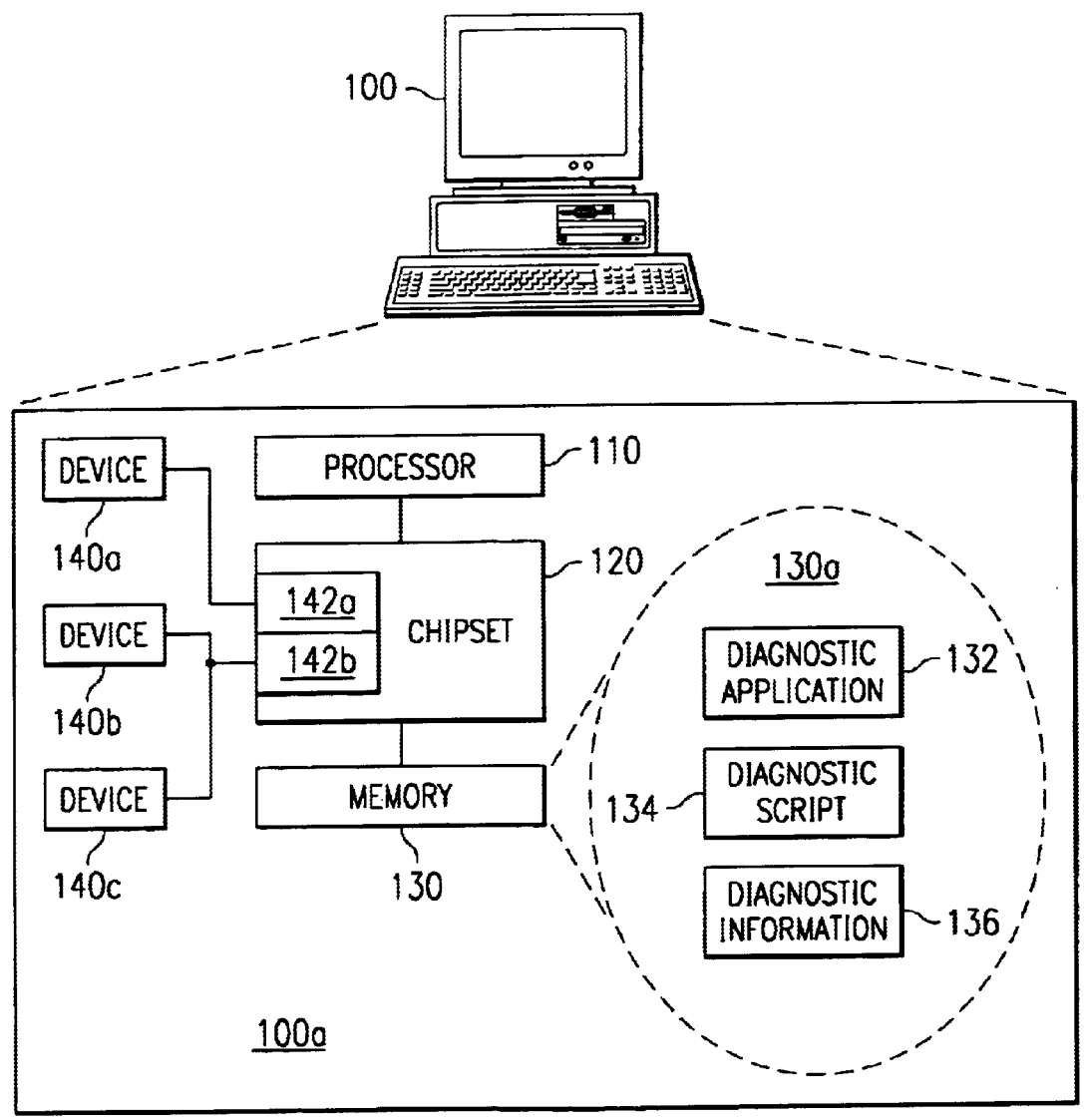
FIG. 1 is a diagram illustrating an embodiment of a computer system.

FIG. 1 is a diagram illustrating an embodiment of a computer system. FIG. 1 depicts a computer system 100. Computer system 100 includes a processor 110, a chipset 120, a memory 130, and a plurality of devices 140a, 140b, and 140c. Device 140a may be coupled to a port 142a. Devices 140b and 140c may be coupled to a shared bus 142b. A portion of memory 130a within memory 130 may include a diagnostic application 132, a diagnostic script 134, and a provided amount of diagnostic information 136. Diagnostic application 132 includes a plurality of diagnostic routines.

In computer system 100, diagnostic script 134 may be executed by computer system 100 and may identify a set of diagnostic routines within diagnostic application 132 that may be selected for execution by computer system 100. To do so, diagnostic script 134 may cause machine information corresponding to computer system 100 to be read. The machine information may include an operating system type and a machine type. The operating system type may be, for example, Windows 95™, Windows 98™, Windows NT™, Windows 2000™, Linux, or any other operating system configured to run on computer system 100. The machine type may be an identifier that may be used to indicate the platform or system configuration of computer system 100 as specified by a manufacturer of computer system 100. The operating system type and machine type may be determined by accessing information stored in memory 130 and/or by using an application program interface (API) provided by an operating system.

Once diagnostic script 134 has read the machine information, it may cause information corresponding to the machine information to be read from diagnostic information 136. Diagnostic information 136 may include information regarding components or diagnostic routines that are supported by one or more individual systems offered by a computer manufacturer. This information may be broken down by operating system type and machine type such that diagnostic script 134 may be configured to detect a list of included components or diagnostic routines based on the operating system type and then detect a list of excluded components or diagnostic routines based on the machine type. Using information in diagnostic information 136, diagnostic script 134 may identify the diagnostic routines in diagnostic application 132 that are supported by computer system 100. Diagnostic script 134 may cause the supported diagnostic routines in diagnostic application 132 to become selectable for execution. Diagnostic script 134 may also cause the remaining, unsupported diagnostic routines in diagnostic application 132 to become not selectable for execution. The supported diagnostic routines may be selected for execution by any suitable means. For example, the supported diagnostic routines may be presented to a user in a user interface that displays an indicator for each supported diagnostic routine. A user may then select a supported diagnostic routine for execution using its indicator. The indicator may include a graphical and a textual representation of a component corresponding to the diagnostic routine. For example, if the component is a hard disk drive, the indicator may include a picture of a generic hard disk drive and the text "HARD DISK DRIVE". The supported diagnostic routines may also be selected for execution by a program configured to test one or more components in computer system 100. The program may receive an indication of the supported diagnostic routines and may use this indication to call one or more of the supported diagnostic routines. Once a supported diagnostic routine has been selected for execution, it may be executed by processor 110.

The supported diagnostic routines in a given computer system such as computer system 100 may each correspond to one or more components of the system. Components, as used herein, include all devices, ports, buses, and other elements of a computer system that may be operatively connected, by hardwired or wireless means, to the computer system. While examples of devices may include processors, memory devices such as a hard disk drive or SDRAM, graphics cards or accelerators, CD-ROM or DVD drives, and input/output devices such as a keyboard, a mouse, or a joystick, the term components is intended to encompass all types of devices that may be included in or coupled to a computer system.

As shown in FIG. 1, computer system 100 includes device 140a coupled to chipset 120 using port 142a. In addition, devices 140b and 140c are coupled to chipset 120 using shared bus 142b. Chipset 120 is coupled to processor 110 and memory 130. Diagnostic application 132 may include one or more diagnostic routines for some or all of these components, i.e. devices 140a, 140b, and 140c, port 142a, shared bus 142b, processor 110, chipset 120, and memory 130. For example, a diagnostic routine included in diagnostic application 132 may be configured to test memory 130. This diagnostic routine, along with other supported diagnostic routines, may be detected by diagnostic script 134 and may become selectable for execution.

It may be noted that diagnostic application 132, diagnostic script 134, and diagnostic information 136 may be included in computer system 100 by a computer manufacturer regardless of the platform or operating system of computer system 100. Diagnostic script 134 may be configured to determine the platform and operating system of computer system 100 and use that information along with information in diagnostic information 136 to determine which of the diagnostic routines in diagnostic application 132 may be selected for execution on computer system 100. A computer manufacturer may include information regarding each platform and operating system that it offers in diagnostic information 136. Accordingly, a computer manufacturer may be able to install diagnostic application 132, diagnostic script 134, and diagnostic information 136 in each system it sells with only relatively minor modifications. In one embodiment configured to use a Windows operating system, diagnostic information 136 may be included in a file using .INI format. In another embodiment, diagnostic information 136 may be included in a file using XML format. In other embodiments, diagnostic information 136 may be included in any type of flat file accessible by diagnostic script 134. A specific embodiment of diagnostic information 136 is described below in FIG. 5.

Figure 2A:
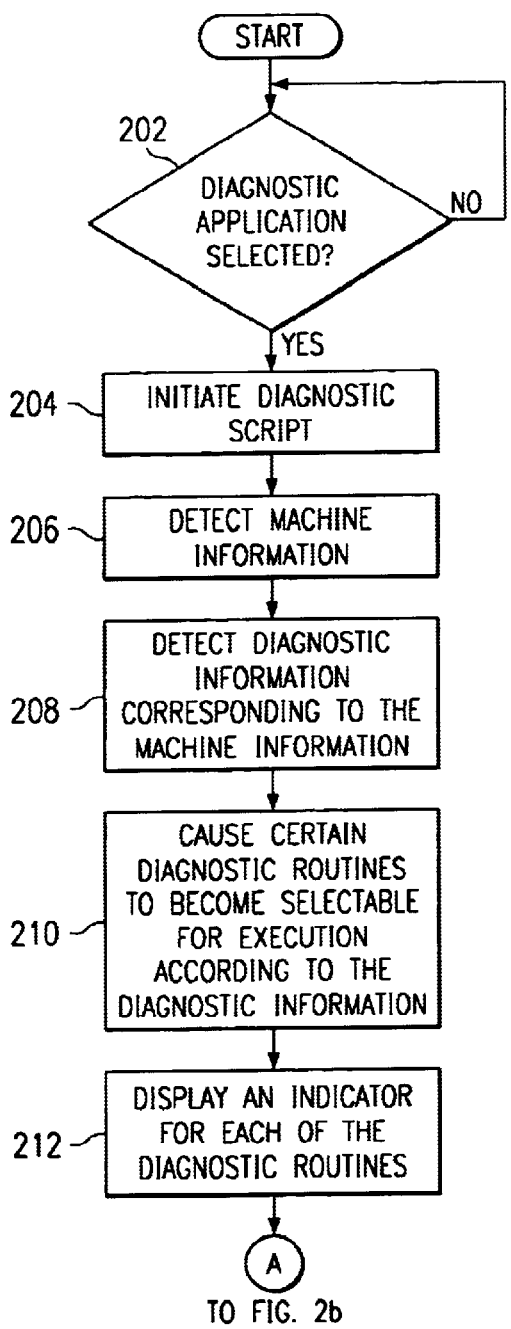
FIG. 2a is a flowchart illustrating a first part of an embodiment of a method for indicating available diagnostic routines using system information in a computer system.
Figure 2B:
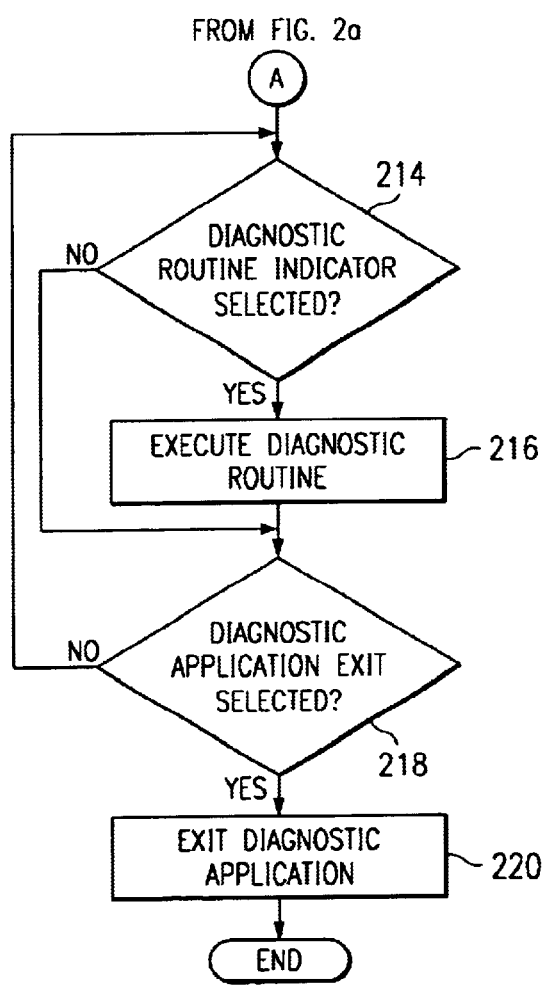
FIG. 2b is a flowchart illustrating a second part of an embodiment of a method for indicating available diagnostic routines using system information in a computer system.

FIG. 2a and FIG. 2b are a flowchart illustrating an embodiment of a method for indicating available diagnostic routines using system information in a computer system. Variations on the method are possible and contemplated. In FIG. 2a, a determination may be made as to whether a diagnostic application has been selected as indicated in step 202. The diagnostic application may be selected by a user or by a program seeking to cause one or more diagnostic routines to be executed. If a diagnostic application has not been selected, then the determination may be made again at a later time as indicated. If a diagnostic application has been selected, then a diagnostic script may be initiated as indicated in step 204. Machine information may be detected as indicated in step 206. In one embodiment, machine information may include an operating system type and a machine type as noted above. In other embodiments, machine information may include other types of information. Diagnostic information corresponding to the machine information may be detected as indicated in step 208. The diagnostic information may be contained in a file with a format such as .INI or XML as noted above. Certain diagnostic routines may be caused to become selectable for execution as indicated in step 210. An indicator may be displayed for each of the selectable diagnostic routines as indicated in step 212. In one embodiment, the indicator for each diagnostic routine may include a graphical and a textual representation of a component corresponding to the diagnostic routine.

Following point A in FIG. 2a to point A in FIG. 2b, a determination may be made as to whether a diagnostic routine indicator has been selected as indicated in step 214. In one embodiment, a diagnostic routine may be selected by a user. In another embodiment, a diagnostic routine may be selected by a program configured to test one or more components in a system. If a diagnostic routine indicator has been selected, then a diagnostic routine corresponding to the selected indicator may be executed as indicated in step 216. A determination may be made as to whether a diagnostic application exit has been selected as indicated in step 218. If a diagnostic application exit has not been selected, then the determination of step 214 may be repeated as indicated. If a diagnostic application exit has been selected, then the diagnostic application may be exited as indicated in step 220.

Figure 3A:
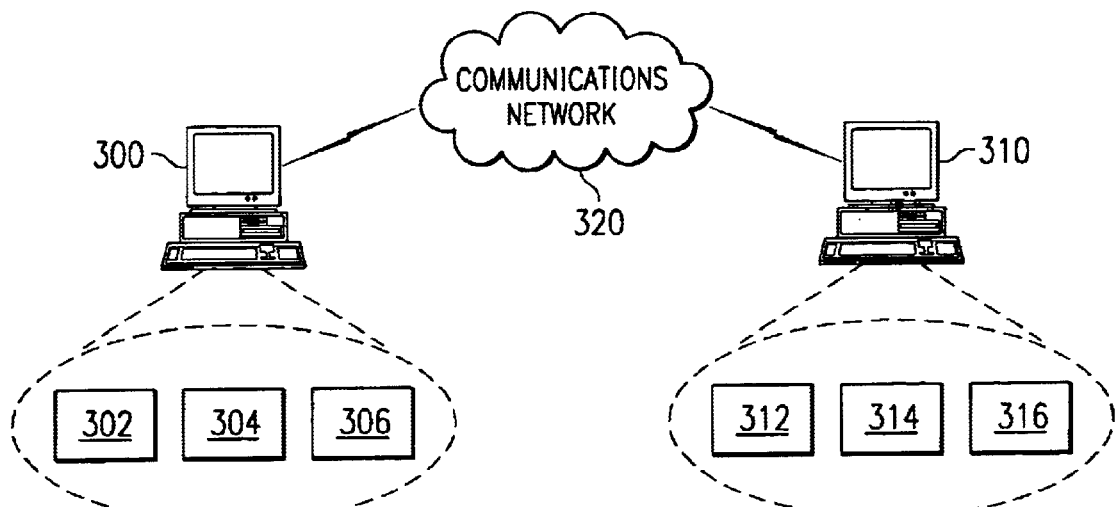
FIG. 3a is a diagram illustrating an embodiment of computer systems configured to communicate using a communications network.

FIG. 3*a* is a diagram illustrating an embodiment of computer systems configured to communicate using a communications network. FIG. 3*a* depicts a computer system 300 configured to communicate with a computer system 310 using a communications network 320. Computer system 300 may include a diagnostic application 302, a diagnostic script 304, and a provided amount of diagnostic information 306. Computer system 310 may include a diagnostic application 312, a diagnostic script 314, and a provided amount of diagnostic information 316.

Computer system 300 be a manufacturer's computer and computer system 310 may be a consumer's computer. Diagnostic application 312, diagnostic script 314, and diagnostic information 316 may be configured to operate similarly to diagnostic application 132, diagnostic script 134, and diagnostic information 136, respectively, as described above in FIG. 1. Diagnostic application 302, diagnostic script 304, and diagnostic information 306 may be the most recent versions of a diagnostic application, a diagnostic script, and a diagnostic information, respectively, used by a computer manufacturer.

At times, computer system 310 may be configured to determine whether diagnostic application 312, diagnostic script 314, and diagnostic information 316 have been updated, i.e. whether newer versions of each exist. Computer system 310 may be configured to compare the versions of diagnostic application 312, diagnostic script 314, and diagnostic information 316 with the versions of diagnostic application 302, diagnostic script 304, and diagnostic information 306, respectively, to make this determination. If computer system 310 does not have the newest versions of diagnostic application 312, diagnostic script 314, and/or diagnostic information 316, computer system 310 may be configured to download the newest version of one or more of diagnostic application 312, diagnostic script 314, and diagnostic information 316. Computer system 310 may be configured to do so automatically or at the request of its user.

Figure 3B:
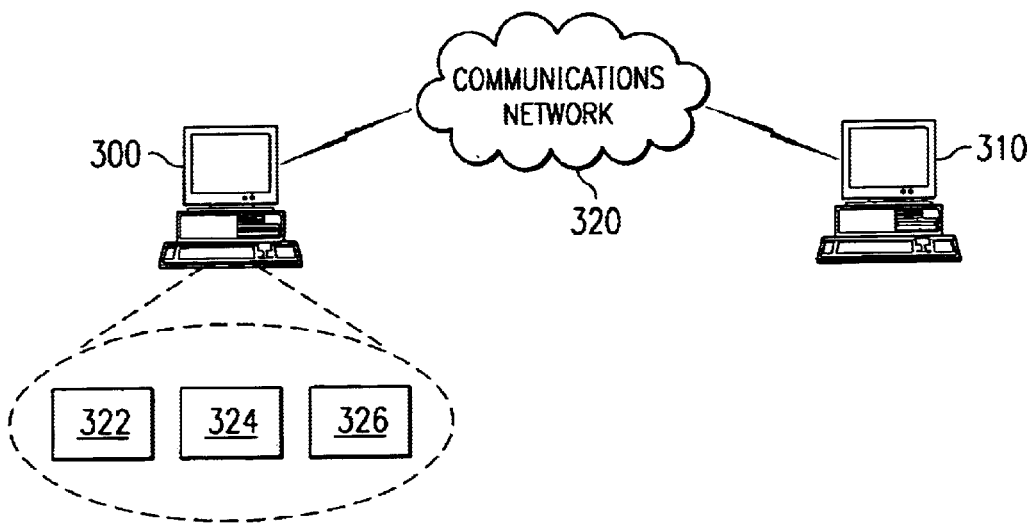
FIG. 3b is a diagram illustrating an embodiment of computer systems configured to communicate using a communications network.

FIG. 3*b* is a diagram illustrating an embodiment of computer systems configured to communicate using a communications network. FIG. 3*b* depicts computer system 300 configured to communicate with computer system 310 using communications network 320. Computer system 300 may include a diagnostic application 322, a diagnostic script 324, and a provided amount of diagnostic information 326.

Computer system 300 may be a manufacturer's computer and computer system 310 may be a consumer's computer. Diagnostic application 322, diagnostic script 324, and diagnostic information 326 may be configured to operate similarly to diagnostic application 132, diagnostic script 134, and diagnostic information 136, respectively, as described above in FIG. 1. Diagnostic application 322, diagnostic script 324, and diagnostic information 326 may be the most recent versions of a diagnostic application, a diagnostic script, and a diagnostic information, respectively, used by a computer manufacturer.

Diagnostic application 322, diagnostic script 324, and diagnostic information 326 may be configured to operate on computer system 300 to identify diagnostic routines that may be executed using components in computer system 310. Diagnostic routines may be presented to a user of computer system 310 with a user interface. Computer systems 300 and 310 may be configured to communicate to allow diagnostic application 322 and diagnostic script 324 to be executed on computer system 300 to test components of computer system 310.

FIGS. 3*a* and 3*b* illustrate the ability of a computer manufacturer to update a diagnostic application, diagnostic script, or diagnostic information using a communications network. As shown in FIG. 3*a*, updated versions may be downloaded to a user's system. In the system of FIG. 3*b*, updated versions are used automatically as the diagnostic application, the diagnostic script, and the diagnostic information are all located on a manufacturer's computer and accessed from there each time they are used on a customer's computer.

Figure 4:
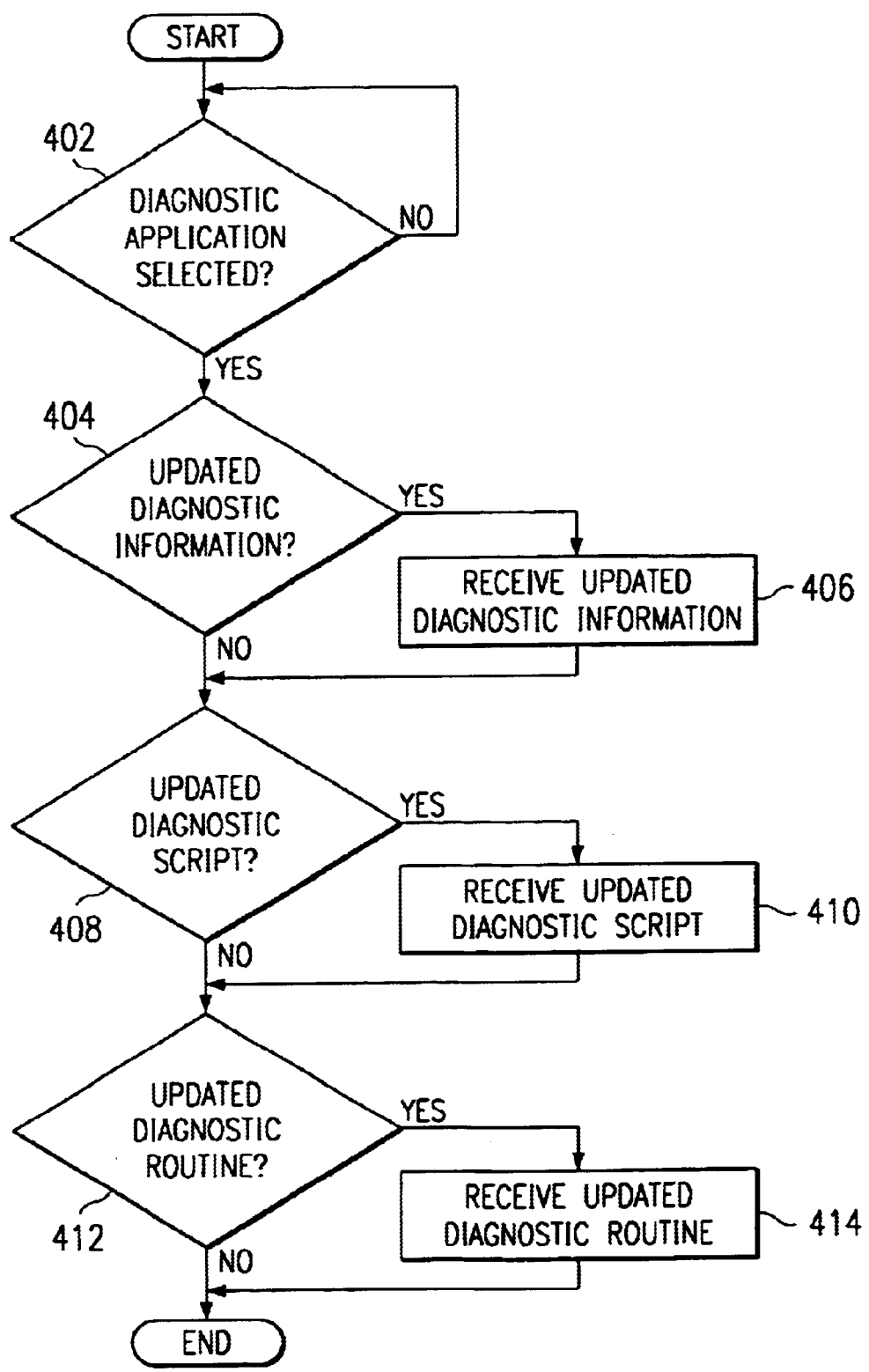
FIG. 4 is a flowchart illustrating an embodiment of a method for updating diagnostic files and information on a computer system.

FIG. 4 is a flowchart illustrating an embodiment of a method for updating diagnostic files and information on a computer system. In FIG. 4, a determination may be made as to whether a diagnostic application has been selected as indicated in step 402. If a diagnostic application has not been selected, then the determination may be made again at a later time as indicated. If a diagnostic application has been selected, then a determination may be made as to whether updated diagnostic information exists as indicated in step 404. If updated diagnostic information exists, then updated diagnostic information may be received as indicated in step 406. In step 408, a determination may be made as to whether an updated diagnostic script exists. If an updated diagnostic script exists, then the updated diagnostic script may be received as indicated in step 410. In step 412, a determination may be made as to whether an updated diagnostic routine exists. If an updated diagnostic routine exists, then the updated diagnostic routine may be received as indicated in step 414.

FIG. 5 is an embodiment of types of information that may be included in a diagnostic information file. FIG. 5 depicts a diagnostic information file 500. Diagnostic information file 500, entitled DIAGCONF.INI includes information corresponding to a plurality of operating system types 510, 512, 520, 522, 530, and 532, information corresponding to a component 540, 542, and 544, and information corresponding to a machine type 550, 552, 554, 556, 558, and 560. FIG. 5 depicts only a portion of the information that may be included in a diagnostic information file.

Operating system type information 510, 520, and 530 list the diagnostic routines for the components supported, separated by delimiters, for each corresponding operating system type 512, 522, and 532. For example, for the Win NT (Windows NT) operating system 522, the supported diagnostic routines include diagnostic routines for AGP, audio, AVI, and so on up to Zip Drive as shown in bracket 520. Similarly, the Win 9x (Windows 95 and 98) operating system 512 supports the diagnostic routines for the components listed in bracket 510 and the Win 2k (Windows 2000) operating system 532 supports the diagnostic routines for the components listed in bracket 530. As may be seen, different operating systems may support different components. The diagnostic routines for the components supported by other operating systems may be listed in a similar manner.

Component information 540, 542, and 544 illustrate an example of information that may be used to display information corresponding to a component. In this example, the abstract "Hard Disk Drive Diagnostic" 542 and the icon file "HardDrive.jpg" 544 may be used as an indicator for systems that support a hard disk drive as indicated by text 540. Component information for other components may be included in a similar manner.

Machine type information 550, 552, 554, 556, 558, and 560 illustrate an example of information that may be used to list the diagnostic routines for the components that are not supported, separated by delimiters, for each operating system (bracket 554) for the machine ID byte 550. Comments 552 may be used to describe the machine type. List 556 lists the components whose diagnostic routines are not supported in the Windows 95 and 98 operating systems. Similarly, lists 558 and 560 list the components whose diagnostic routines are not supported in the Windows NT and Windows 2000 operating systems, respectively. The components whose diagnostic routines are not supported in other operating systems may be listed similarly. As may be seen, different systems or platforms may support different components for each operating system. Machine type information may be included for each system or platform offered by a computer manufacturer.

A diagnostic script, such as diagnostic script 134 in FIG. 1, may use diagnostic information file 500 to identify diagnostic routines that may be selected for execution. For example, a diagnostic script for a computer system with machine ID byte 550 ("0×BA") running Windows NT may include the diagnostic routines for the components that are included in the bracketed list 520 and not excluded by the list 558. The script may use the component information for each of these components, such as component information 540, 542, and 544 for the hard disk drive, to display the selectable diagnostics to a user.

FIG. 6a, FIG. 6b, and FIG. 6c is an embodiment of a diagnostic script 600 that may be used to determine what diagnostic routines a computer system supports. The diagnostic script 600 may be composed of Java Scripts/Methods/Functions as indicated in FIGS. 6a, 6b, and 6c. The script may get a diagnostic information file location as highlighted by a comment 602. The script may then determine an operating system platform by calling a Java method which calls a Windows API that returns the operating system that is installed as highlighted by a comment 604. Next, the script may load a list of supported diagnostics for the operating system platform from the information file as highlighted by a comment 606. The script may then load a list of unsupported diagnostic routines from the information file based on machine and operating system platform as highlighted by a comment 608. The script may remove the excluded diagnostics from the supported list as highlighted by a comment 610 and may build a list of supported diagnostic and presentation items from the information file as highlighted by a comment 612. The, script may next set the environment global space as highlighted by a comment 614. The script may load the machine ID for the machine under test as highlighted by a comment 616. The script may then call a Java method that extracts the machine ID from the SMBIOS table as highlighted by a comment 618. Finally, the script may create the list of supported diagnostics and their presentation items as highlighted by a comment 620.

Figure 7A:
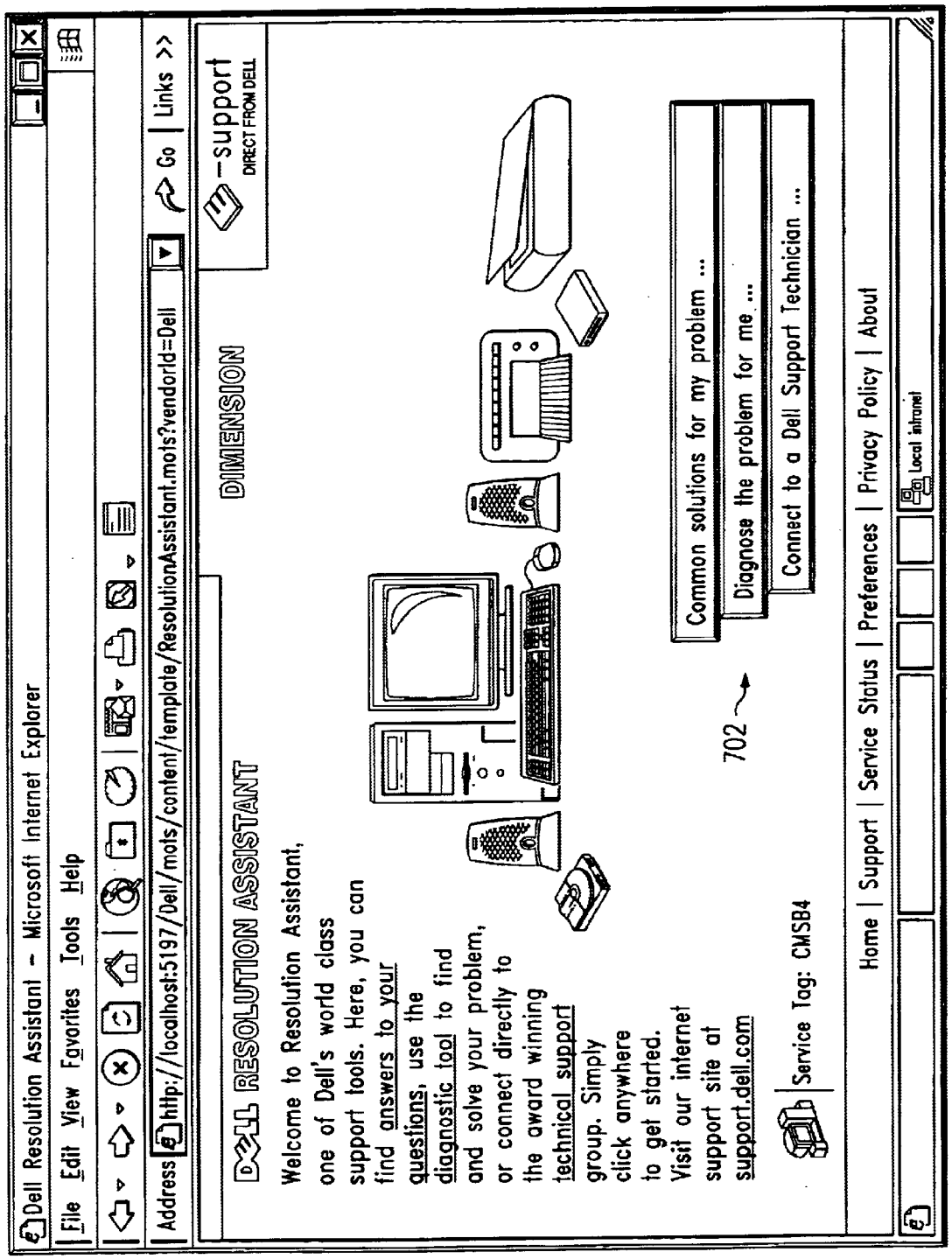
FIG. 7a is an illustration of a first screen displayable by a display device in the embodiment shown in FIG. 1.
Figure 7B:
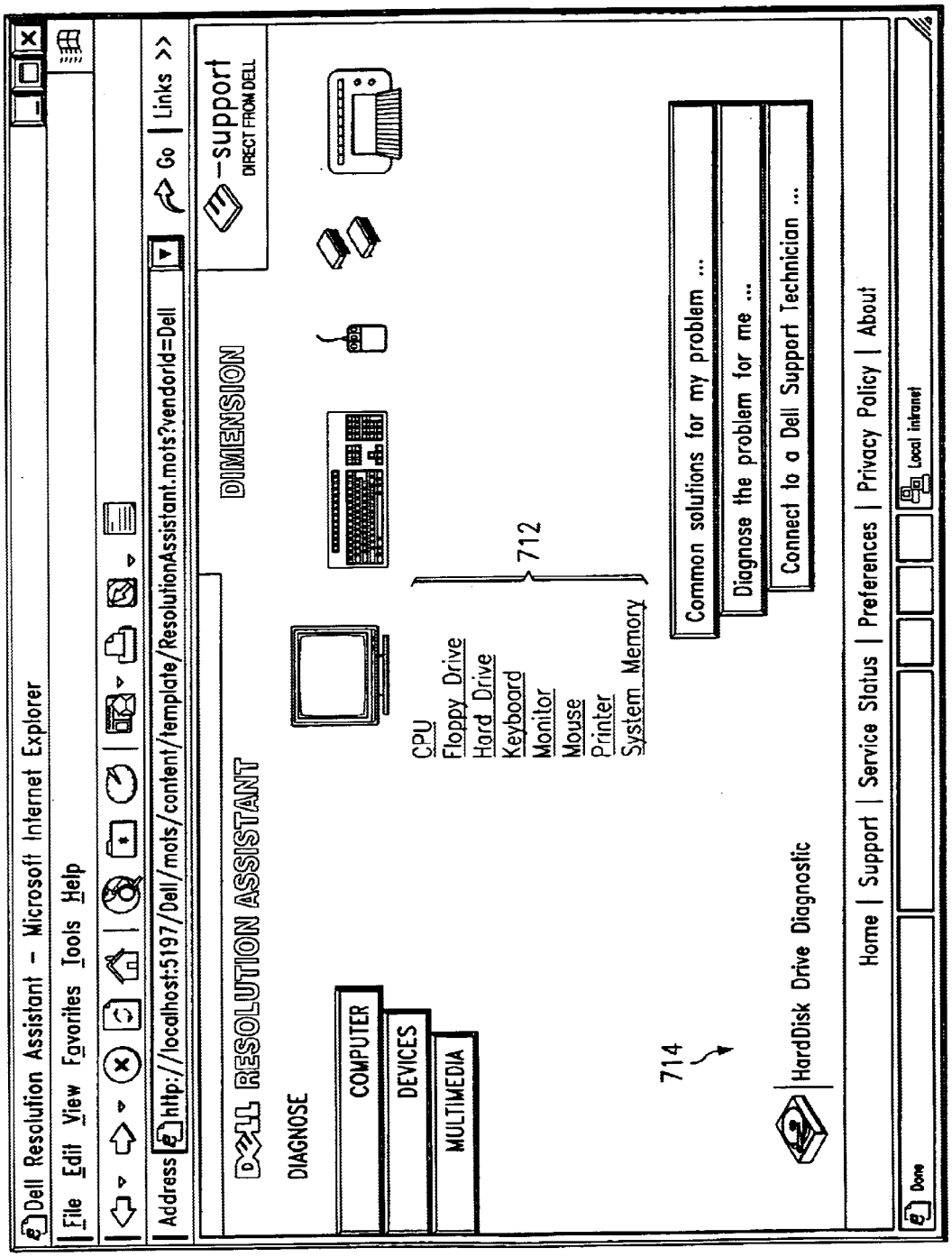
FIG. 7b is an illustration of a second screen displayable by a display device in the embodiment shown in FIG. 1.

FIG. 7a, FIG. 7b, and FIG. 7c are an illustration of a first screen, a second screen, and a third screen displayable by a display device in the embodiment shown in FIG. 1. When a user selects a help application, a user may be present with a screen 700. One option the user may have may be to launch a diagnostic application. In screen 700, the user may launch a diagnostic application by selecting the area indicated by an arrow 702. By selecting the area indicated by arrow 702, the user may also launch a diagnostic script that is configured to identify diagnostic routines that are selectable for execution.

The results provided by the diagnostic script may be used to create screen 710 shown in FIG. 7b. Screen 710 includes a list of components 712 supported by the system. When a component in list 712 is highlighted (such as by moving the mouse over the text of the component in list 712), an indicator corresponding to the component may be displayed as indicated by an indicator 714. Indicator 714 includes a graphical representation of the component and a textual representation of the component, in this case a hard disk drive. It may be noted that the graphical representation may correspond to an icon in the diagnostic information file, such as icon 544 in FIG. 5, and the textual representation may correspond to an abstract in the diagnostic information file, such as abstract 542 in FIG. 5.

A screen 720 may be displayed in response to indicator 714 being selected. As may be seen, screen 720 includes textual information regarding questions a user may have and diagnostic routines a user may cause to be executed. In screen 720, a user may cause diagnostic routines for the selected component to be executed by selecting an indicator 722.

As can be seen, the principal advantages of these embodiments may be that an entire suite of diagnostic routines may be installed on each computer system a computer manufacturer offers while only supported diagnostic routines may be made selectable for execution on a particular system based on certain characteristics of that system. In this way, the process of installing diagnostic routines may be substantially similar or even identical for each system that a computer manufacturer offers. In addition, these embodiments may advantageously allow a computer manufacturer to change the set of supported diagnostic routines on a system or systems while minimizing the development effort and test cycle for each change. In certain embodiments, the changes may be made by simply changing one or more delimited fields in a diagnostic information file. The embodiments may also advantageously allow a computer manufacturer to easily offer additional systems or test support with minimal development effort and testing. In certain embodiments, information corresponding to a new system may be added to a diagnostic information file such that the information may be accessed by a diagnostic script to identify the diagnostic routines that are supported in the new system.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A method of updating diagnostic information comprising:
   detecting machine information;
   detecting diagnostic information corresponding to the machine information;
   including updated diagnostic script, application and information in a first computer;
   communicating the updated diagnostic script, application and information to a second computer via a network;
   the second computer comparing the diagnostic script, application and information communicated from the first computer to determine whether a newer version of each exists; and if the newer version exists, the second computer downloading the newer version from the first computer.

2. The method of claim 1, further comprising:

displaying an indicator corresponding to the one of the plurality of diagnostic routines.

3. The method of claim 2, wherein the indicator includes a graphical representation of a component corresponding to the one of the plurality of diagnostic routines and a textual representation of the component.

4. The method of claim 3, further comprising:

selecting the indicator; and executing the one of the plurality of diagnostic routines in response to the selecting.

5. The method of claim 1, wherein the machine information includes an operating system type and a machine type, and wherein the diagnostic information includes a list of included components corresponding to the operating system type and a list of excluded components corresponding to the machine type.

6. The method of claim 5, wherein a component corresponding to the one of the plurality of diagnostic routines is included in the list of included components, and wherein the component is not included in the list of excluded components.

7. A computer system comprising:

a first computer including:
    a processor; and
    a memory coupled to the processor;
    the memory including a diagnostic script, a diagnostic application including a plurality of diagnostic routines, updated diagnostic information, and machine information;
a second computer;
a communications network;
the first computer and second computer being configured to communicate using the communications network;
communicating the updated diagnostic script, application and information to the second computer via the network;
the second computer comparing the diagnostic script, application and information communicated from the first computer to determine whether a newer version of each exists; and
if the newer version exists, the second computer downloading the newer version from the first computer.

8. The computer system of claim 7, wherein the diagnostic script is executable by the processor to cause an indicator corresponding to the one of the plurality of diagnostic routines to be displayed.

9. The computer system of claim 8, wherein the indicator includes a graphical representation of a component corresponding to the one of the plurality of diagnostic routines and a textual representation of the component.

10. The computer system of claim 9, wherein the processor is configured to execute the one of the plurality of diagnostic routines in response to the indicator being selected.

11. The computer system of claim 7, wherein the machine information includes an operating system type and a machine type, and wherein the updated diagnostic information includes a list of included components corresponding to the operating system type and a list of excluded components corresponding to the machine type.

12. The computer system of claim 11, further comprising:

a component coupled to the processor;

wherein the component is included in the list of included components and not included in the list of excluded components, and wherein the component corresponds to the one of the plurality of diagnostic routines.

13. A computer system comprising:

a first computer including:
    a processor;
    a memory coupled to the processor;
    the memory including a diagnostic script, a plurality of diagnostic routines, first diagnostic information, and machine information;
    the diagnostic script being executable by the processor to cause the machine information to be read, to cause a portion of the first diagnostic information corresponding to the machine information to be read, and to cause one of the plurality of diagnostic routines supported by the computer system to become selectable for execution by the processor according to the portion of the first diagnostic information, and to cause another of the diagnostic routines, not supported by the computer system to be not selectable for execution;
a second computer;
a communications network;
the first computer and second computers being configured to communicate using the communications network;
communicating the diagnostic script and first diagnostic information to the second computer via the network;
the second computer comparing the diagnostic script and first diagnostic information to determine whether a newer version of each exists; and
if a newer version exists, the second computer downloading the newer version from the first computer.

* * * * *